(12) United States Patent
Pridgen

(10) Patent No.: US 11,019,083 B2
(45) Date of Patent: May 25, 2021

(54) SYSTEM FOR COORDINATING DISTRIBUTED WEBSITE ANALYSIS

(71) Applicant: Cisco Technology, Inc., San Jose, CA (US)

(72) Inventor: Adam Thomas Pridgen, Montgomery, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 197 days.

(21) Appl. No.: 16/013,681

(22) Filed: Jun. 20, 2018

(65) Prior Publication Data
US 2019/0394218 A1    Dec. 26, 2019

(51) Int. Cl.
| | |
|---|---|
| *H04L 29/00* | (2006.01) |
| *H04L 29/06* | (2006.01) |
| *G06F 16/28* | (2019.01) |
| *G06F 16/951* | (2019.01) |
| *H04L 29/08* | (2006.01) |

(52) U.S. Cl.
CPC ........ *H04L 63/1425* (2013.01); *G06F 16/285* (2019.01); *G06F 16/951* (2019.01); *H04L 63/1416* (2013.01); *H04L 67/10* (2013.01)

(58) Field of Classification Search
CPC . H04L 63/1425; H04L 63/1416; H04L 67/10; H04L 67/30598; G06F 17/30864; G06F 17/30598; G06F 16/951; G06F 16/285
See application file for complete search history.

(56) References Cited

U.S. PATENT DOCUMENTS

| | | | |
|---|---|---|---|
| 5,812,773 A | 9/1998 | Norin | |
| 5,889,896 A | 3/1999 | Meshinsky et al. | |
| 6,108,782 A * | 8/2000 | Fletcher | G06F 8/65 370/245 |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Thomas et al., "Design and Evaluation of a Real-Time URL Spam Filtering Service,".

(Continued)

*Primary Examiner* — Don G Zhao
(74) *Attorney, Agent, or Firm* — Polsinelli PC

(57) ABSTRACT

The disclosed technology relates a system is configured to identify a domain for analysis, transmit instructions for querying the domain to each network device in a set of network devices, receive domain reports associated with the domain for analysis from the set of network devices, and determine, based on the domain reports, that the domain is associated with malicious features.

20 Claims, 5 Drawing Sheets

(56) References Cited

U.S. PATENT DOCUMENTS

| | | |
|---|---|---|
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,291,065 B2 | 10/2012 | Goodman et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,539,577 B1 * | 9/2013 | Stewart .............. H04L 29/12066 726/22 |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski David |
| 9,516,053 B1 * | 12/2016 | Muddu .............. H04L 63/1408 |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,621,566 B2 | 4/2017 | Gupta et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 9,882,999 B1 * | 1/2018 | Xu .......................... H04L 67/22 |
| 10,033,753 B1 * | 7/2018 | Islam .................. H04L 63/1425 |
| 10,050,998 B1 * | 8/2018 | Singh .................. H04L 63/1433 |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0069666 A1 * | 3/2006 | Burke .................. G06Q 10/063 |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |

(56) References Cited

U.S. PATENT DOCUMENTS

| | | |
|---|---|---|
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0275561 A1* | 10/2013 | Phillips .................. H04L 65/60 709/219 |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0026220 A1* | 1/2014 | Gehrig, Jr. .............. H04L 67/38 726/23 |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |

(56) References Cited

U.S. PATENT DOCUMENTS

| | | |
|---|---|---|
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0189864 A1* | 7/2014 | Wang ............... G06F 21/51 726/23 |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0250106 A1* | 9/2014 | Shapira ............... G06F 3/0482 707/722 |
| 2014/0281173 A1 | 9/2014 | Im et al. |
| 2014/0282493 A1* | 9/2014 | Glover ............... G06F 8/61 717/176 |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0298460 A1* | 10/2014 | Xue ............... H04L 63/1425 726/23 |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0235152 A1* | 8/2015 | Eldardiry ............... G06F 21/552 705/7.28 |
| 2015/0242204 A1 | 8/2015 | Hassine et al. |
| 2015/0249709 A1 | 9/2015 | Teng et al. |
| 2015/0254555 A1* | 9/2015 | Williams, Jr. ....... G06N 3/0454 706/14 |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0078141 A1* | 3/2016 | Fang ............... G06F 16/9535 707/709 |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0094937 A1* | 3/2016 | Wang ............... H04L 67/1061 455/456.3 |
| 2016/0098561 A1* | 4/2016 | Keller ............... G06F 21/554 726/24 |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0352679 A1* | 12/2016 | Hagen ............... H04L 61/1511 |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026390 A1* | 1/2017 | Sofka ............... H04L 63/1416 |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0060986 A1* | 3/2017 | Ideses ............... G06F 40/106 |
| 2017/0063888 A1* | 3/2017 | Muddu ............... G06F 3/04847 |
| 2017/0078922 A1* | 3/2017 | Raleigh ............... H04L 69/18 |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0155666 A1* | 6/2017 | Seul ............... H04L 63/1416 |
| 2017/0163531 A1 | 6/2017 | Kumar et al. |
| 2017/0169013 A1* | 6/2017 | Sarikaya ............... G06N 20/00 |
| 2017/0171158 A1 | 6/2017 | Hoy et al. |
| 2017/0180380 A1* | 6/2017 | Bagasra ............... H04L 63/101 |
| 2017/0195293 A1 | 7/2017 | Dahan et al. |
| 2017/0264663 A1 | 9/2017 | Bicket et al. |
| 2017/0339070 A1 | 11/2017 | Chang et al. |
| 2018/0027013 A1* | 1/2018 | Wright ............... H04L 63/1483 726/23 |
| 2018/0049253 A1* | 2/2018 | Lee ............... H04W 76/11 |
| 2018/0077120 A1* | 3/2018 | Baughman ............... H04L 63/0281 |
| 2018/0115582 A1* | 4/2018 | Thakar ............... H04L 63/1466 |
| 2018/0205753 A1* | 7/2018 | Raz ............... H04L 63/1425 |
| 2018/0234302 A1* | 8/2018 | James ............... H04L 41/145 |
| 2018/0343272 A1* | 11/2018 | Khalil ............... H04L 63/1425 |
| 2019/0007506 A1* | 1/2019 | Xu ............... G06F 16/24578 |
| 2019/0014149 A1* | 1/2019 | Cleveland ............... H04L 9/3247 |
| 2019/0081958 A1* | 3/2019 | Lee ............... H04L 63/145 |

(56) References Cited

U.S. PATENT DOCUMENTS

| | | | | |
|---|---|---|---|---|
| 2019/0089721 | A1* | 3/2019 | Pereira | H04L 63/1416 |
| 2019/0097965 | A1* | 3/2019 | Linari | H04L 61/1511 |
| 2019/0222589 | A1* | 7/2019 | Kislitsin | H04L 63/1416 |
| 2019/0260791 | A1* | 8/2019 | Gladstone | G06F 3/0484 |
| 2019/0334869 | A1* | 10/2019 | Grant | H04L 61/3025 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Varshney et al., "A survey and classification of web phishing detection schemes," Security Comm. Networks 2016, vol. 9, Oct. 26, 2016, pp. 6266-6284.

Amedro, Brian, et al., "An Efficient Framework for Running Applications on Clusters, Grids and Cloud," 2010, 17 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 2014, 4 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Author Unknown, "Use Cases and Interactions for Managing Clouds, A White Paper from the Open Cloud Standards Incubator," Version 1.0.0, Document No. DSP-ISO0103, Jun. 16, 2010, 75 pages.

Author Unknown, "Apache Ambari Meetup What's New," Hortonworks Inc., Sep. 2013, 28 pages.

Author Unknown, "Introduction," Apache Ambari project, Apache Software Foundation, 2014, 1 page.

Baker, F., "Requirements for IP Version 4 Routers," Jun. 1995, 175 pages, Network Working Group, Cisco Systems.

Beyer, Steffen, "Module "Data::Locations?!", " YAPC::Europe, London, UK,ICA, Sep. 22-24, 2000, XP002742700, 15 pages.

Blanchet, M., "A Flexible Method for Managing the Assignment of Bits of an IPv6 Address Block," Apr. 2003, 8 pages, Network Working Group, Viagnie.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://1www.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

Citrix, "Citrix StoreFront 2.0" White Paper, Proof of Concept Implementation Guide, Citrix Systems, Inc., 2013, 48 pages.

Citrix, "CloudBridge for Microsoft Azure Deployment Guide," 30 pages.

Citrix, "Deployment Practices and Guidelines for NetScaler 10.5 on Amazon Web Services," White Paper, citrix.com, 2014, 14 pages.

CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.

Fang K., "LISP MAC-EID-TO-RLOC Mapping (LISP based L2VPN)," Network Working Group, Internet Draft, CISCO Systems, Jan. 2012, 12 pages.

Ford, Bryan, et al., Peer-to-Peer Communication Across Network Address Translators, In USENIX Annual Technical Conference, 2005, pp. 179-192.

Gedymin, Adam, "Cloud Computing with an emphasis on Google App Engine," Sep. 2011, 146 pages.

Good, Nathan A., "Use Apache Deltacloud to administer multiple instances with a single API," Dec. 17, 2012, 7 pages.

Herry, William, "Keep It Simple, Stupid: OpenStack nova-scheduler and its algorithm", May 12, 2012, IBM, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Kumar, S., et al., "Infrastructure Service Forwarding for NSH," Service Function Chaining Internet Draft, draft-kumar-sfc-nsh-forwarding-00, Dec. 5, 2015, 10 pages.

Kunz, Thomas, et al., "OmniCloud—The Secure and Flexible Use of Cloud Storage Services," 2014, 30 pages.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Logan, Marcus, "Hybrid Cloud Application Architecture for Elastic Java-Based Web Applications," F5 Deployment Guide Version 1.1, 2016, 65 pages.

(56) References Cited

OTHER PUBLICATIONS

Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Workgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.orq/w/index.php?title=Filter %28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

SYSTEM FOR COORDINATING DISTRIBUTED WEBSITE ANALYSIS

TECHNICAL FIELD

The subject matter of this disclosure relates in general to the field of network communications, and more specifically classifying websites or other network resources.

BACKGROUND

Malicious websites or other network resources can be a big problem for users when communicating over a network. For example, some websites may attempt to install malware configured to disrupt computer operation, gather personal information, or gain access to a computing device. Other websites may implement pharming or phishing techniques in order to gain personal information of a user, install malware on a computing device, or gain access to private resources. For example, a website may spoof a legitimate website or redirect a user to a spoofed website in order to trick a user to entering personal information or providing access to private resources. Although various cyber security techniques have been created to combat these malicious websites, bad actors have also evolved to combat these cyber security techniques and avoid detection.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
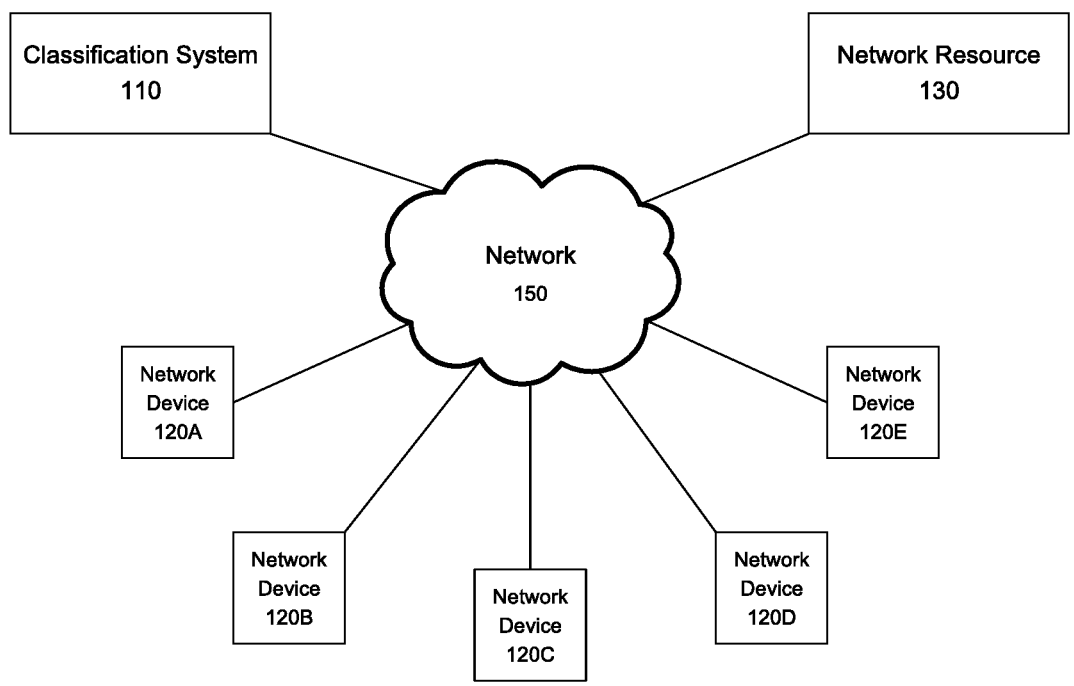
FIG. 1 is a conceptual block diagram illustrating an example network environment, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The disclosed technology relates a system is configured to identify a set of network resources for analysis and transmit, to each network device in a set of network devices, instructions for querying the set of network resources. The system may receive features associated with the set of network resources from the set of network devices and identify at least one network resource in the set of network resources with malicious features. The set of network devices may be geographically dispersed and may include, for example, a network gateway device, a firewall, a router, or a user device.

Identifying the set of domains for analysis may include receiving, from a third-party system, a list of domains registered within a recent time period or receiving, from at least one network device in the set of network devices, a domain of interest in the set of domains. The instructions for querying the set of domains may include query parameters for each network device. The query parameters specify at least one of a web browser type, a web browser version, an operating system type, and an operating system version. The system may also compare the domain features with a library of features, the library of features including the malicious features and/or transmit, to the set of network devices, instructions to block the at least one domain with malicious features.

Example Embodiments

Various cyber security systems attempt to discover malicious websites and prevent these sites from causing users harm (e.g., by blocking or quarantining the websites). For example, a cyber security system may use a web crawler to retrieve content associated with various websites, analyze the content, and determine whether the website is a malicious website. However, bad actors may detect the internet protocol (IP) address, domain, or signature of the cyber security system and/or the web crawler and block the system from retrieving content from a malicious website, thereby preventing the system from being able to discover the malicious website. Although various cyber security techniques have been created to combat these malicious websites, bad actors have also evolved to combat these cyber security techniques and avoid detection.

Aspects of the subject technology relate to a classification system configured to analyze a web resource such as a website or domain in order to determine whether the web resource may be malicious, contain malicious content, redirect communications to a malicious source, or otherwise cause issues for a user or a computing device. Once identified, the classification system may initiate or take steps to contain or restrict access to the malicious web resource or otherwise address the threat posed by the malicious web resource. In order to circumvent efforts by bad actors to inhibit the security measures taken by the classification system, the classification system may coordinate with a set of network devices distributed across one or more networks in order to mask the security measures.

FIG. 1 is a conceptual block diagram illustrating an example network environment 100, in accordance with various embodiments of the subject technology. Various embodiments are discussed with respect to a classification system 110, a set of network devices 120A-E, and one or more network resources 130. The entities shown in the network environment 100 may communicate with one another via one or more networks, such as network 150. However, these embodiments and others may be applied to a wide variety of other network environments and configurations. For example, the network environment 100 may include, for example, any one or more of a cellular network, a satellite network, a personal area network (PAN), a local area network (LAN), a wide area network (WAN), a broadband network (BBN), a cloud managed network, the Internet, and the like. The network environment 100 can be a public network, a private network, or a combination thereof. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols.

The classification system 110 may be implemented as a network controller device for a network fabric or software defined network (SDN), a server, a cloud management system, or other computing device configured to communicate with one or more network devices via the network 150. The network devices 120A-E may include user or client devices such as mobile devices, laptops, computers, set top boxes, smart appliances, smart phones, etc. The network devices 120A-E may also include other computing devices configured to communicate via the network 150 such as access points, switches, routers, network address translation (NAT) servers, middle boxes, virtual machines, firewall systems, gateway devices, or other similar devices. Each network device may include a component (e.g., a software application) configured to coordinate with the classification system 110 in analyzing network resources and detecting cyber threats associated with the network resources.

The network resource 130 may be any resource that may be reached by the classification system 110 or the network devices 120A-E in FIG. 1. For example, the network resource 130 may be a webpage, a domain, or other resource that may be reached via a uniform resource locator (URL) or an internet protocol (IP) address. As will be discussed in further detail, to determine whether the network resource 130 is a security threat, the classification system may be configured to retrieve data associated with network resource 130, analyze the data, and determine whether features associated with the network resource 130 are similar to features associated with malicious network resources or threats. Some network resources (e.g., malicious resources) may attempt to detect a source (e.g., an IP address) of classification and threat detection activities and block or blacklist the source in order to prevent classification of the network resource.

The network devices 120A-E may be configured to act as a proxy for the classification system 110 to inhibit countermeasures implemented by bad actors and/or prevent the network resource 130 from interfering with these classification and threat detection activities. For example, the classification system 110 may transmit, to each network device in a set of network devices 120A-E, instructions to querying network resource 130 for content. The network devices 120A-E, in response to the received instructions, may retrieve content from the network resource 130 and, in some cases, perform one or more processing steps to extract features from the retrieved content. These features associated with the network resource 130 and/or the content retrieved from the network resource 130 may be transmitted to the classification system 110 for analysis. Based on the features associated with the network resource 130 and/or the content retrieved from the network resource 130, the classification system 110 may determine whether the network resource 130 is a threat and blocked if appropriate.

If the network resource 130 employs measures to detect the classification system 110, threat detection activities of the classification system 110, and/or classification activities of the classification system 110, the techniques implemented in various embodiments would hinder or prevent detection of the classification system 110 or the activities of the classification system 110. For example, the network devices 120A-E may act as proxies for the classification system 110 and cloak the activities of the classification system 110. Communications that retrieve content and other data from the network resource 130 may appear to be more similar to normal network communication patterns and less suspicious to network resource 130.

Furthermore, by distributing tasks to the network devices 120A-E, computing resources may be conserved by the classification system 110 and the network 150. For example, by distributing tasks to the network devices 120A-E, bandwidth, processing power, memory, and other computing resources are conserved at the classification system 110. Often times, the network devices 120A-E have a surplus of unused computing resources. Accordingly, use of computing resources as a whole may be more efficiently spread across the classification system 110 and network devices 120A-E. Furthermore, the network devices 120A-E may be configured to filter, compress, and/or process data from the network resource 130 or generated based on interactions with the network resource 130. The resulting data sent from the network devices 120A-E back to the classification system 110 may be less than the content or data obtained via communication with the network resource 130, thereby reducing bandwidth used between the network devices 120A-E and the classification system 110.

Figure 2:
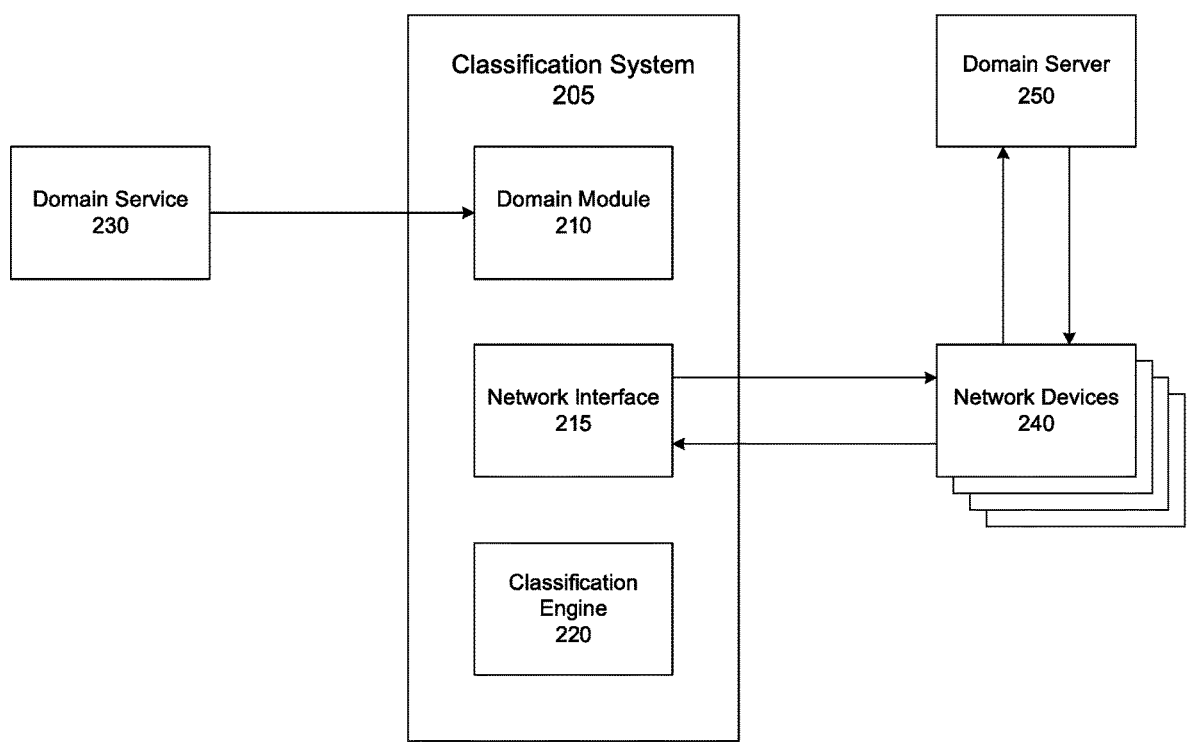
FIG. 2 is a conceptual block diagram providing additional context for a domain and network content classification system, in accordance with various embodiments of the subject technology.

FIG. 2 is a conceptual block diagram providing additional context for a classification system 205, in accordance with various embodiments of the subject technology. The classification system 205 may include a domain module 210, a network interface 215, and a classification engine. However, in other embodiments, there may be additional components, fewer components, and/or alternative components.

The domain module 210 may be configured to identify a set of one or more network resources for analysis and classification. The examples discussed with respect to FIG. 2 may refer to web domains as the network resources being classified. However, network resources may also include web pages, IP addresses, or other resources accessible via a network. According to some embodiments, the domain module 210 may identify for analysis new network resources that have recently been made accessible on the network. For example, the domain module 210 may receive domain information from a domain service 230, analyze the domain information, and identify a set of domains of interest for analysis based on the domain information. The domains of interest may be domains that, for example, have been registered recently or share another characteristic that make the domains appropriate for analysis.

The domain service 230 may be, for example, a domain registrar such as a WHOIS registrar associated with the Internet Corporation for Assigned Names and Numbers (ICANN) organization or other entity configured to publish a list of recently registered domains. The domain service 230 may expose a set an application programming interface (API) that allows the domain module 210 to interface with the domain service 230 and receive domain information. The domain information may include, for example, a domain name, a registrar name, contact or registrant information (e.g., an email, organization name, address, telephone number, etc.), a registrar server identifier, various dates for registration (e.g., a creation date, an update date, an expiration date, etc.), status information, or any other information obtained by the domain service 230. The domain information may include domains that are newly registered within a recent time period. Alternatively, the domain module 210 may identify the domains that are registered with in the recent time period based on the dates in the domain information.

According to other embodiments, the domain service 230 may be a certificate authority service or a certificate transparency logging service configured to generate and maintain a record or log of public key certificates such as secure socket layer (SSL) certificates and/or transport layer security (TLS) certificates. The domain service 230 may be associated with a web crawler configured to crawl the internet and identify new public key certificates to add to the record or log of public key certificates. The domain module 210 may retrieve the certificate log and generate the set of domains for analysis based on newly created public key certificates. In other embodiments, the domain service 230 may be one or more user devices or third-parties that reports new web domains.

Once a set of domains for analysis is identified, the network interface 215 of the classification system 205 may transmit instructions for querying the set of domains to each network device in a set of network devices 240. The instructions may include the set of domains to be queried and parameters for querying the set of domains. The network interface 215 may vary the parameters and send different sets of parameters to the different network devices 240. Based on the parameters, the network devices 240 may query one or more of the domains.

For example, the parameters for querying the domains may include a browser type (e.g., Chrome, Internet Explorer, Safari, etc.), a browser version (e.g., version 3.2), a device type (e.g., mobile device, laptop, etc.), an operating system type (e.g., Windows, iOS, Linux, etc.), an operating system version (e.g., Windows version 10.1), a monitoring time window, or any other parameters that may be used to generate a query to a domain server. A network device may generate a query based on the parameters and transmit the query to a domain server 250. The query may mimic or identify the query as being associated with the browser type, device type, and/or operating system type. The network device may also be configured to query the domain server 250 periodically for the time window or time period specified in the parameters. This may be desirable in order to prevent detection by the domain server 250. In other words, varying the parameters used by the network devices 240 may result in the network devices 240 mimicking random queries (instead of all queries being similar in type) that the domain server 250 is less likely to identify as belonging to a threat detection or classification measure.

Each network device in the set of network devices 240 may receive instructions for querying one or more network resources, generate one or more queries to the one or more domains based on the instructions, and transmit the one or more queries to the one or more domains, domain servers, or network resources. A query may be any communication transmitted to a domain, domain server, or network resource configured to illicit a response. The response may include content (e.g., a web page, media, resource, or other communication from the domain server) that can be analyzed and used to classify the domain, domain server, network content, or network resource.

The network device may receive a response from the domain, domain server, or network resource, generate a report on the domain, domain server, or network resource for the classification system 205, and transmit the report to the classification system 205 for analysis. According to some embodiments, the report may include the content received from the domain server in response to the query. Alternatively or additionally, the network device may also analyze the content received from the domain server and/or perform one or more feature extraction processes on the content in order to generate one or more insights based on the content. The one or more insights may be sent to the classification system 205 in addition to or instead of the content received from the domain server. In other embodiments, a subset of the content is sent to the classification system 205 along with the insights. By analyzing the content and/or performing feature extraction processes on the network devices 240, computing resources (e.g., memory, electricity, heat, compute time, compute power, etc.) are conserved at the classification system 205. Furthermore, in embodiments that transmit the insights instead of all of the content received from the domain server, bandwidth for the classification system 205 is conserved.

The network interface 215 of the classification system 205 may receive the one or more reports from the network devices 240 and the classification engine 220 of the classification system 205 may analyze the data in the reports to classify the domain associated with the domain server 250 and determine whether the domain is a threat or otherwise associated with malicious features. Various classification techniques may be employed. For example, various machine learning techniques may be used to analyze web pages and/or other content retrieved from the domain server 250 or insights extracted from the content in order to determine whether the domain server 250 has characteristics similar associated with malicious entities.

Digital image processing techniques may also be used to determine whether a domain is associated with malicious features by mimicking how a person might observe the content when rendered in a web browser. For example, the content retrieved from a domain server 250 may include one or more images. These images may be compared to a library of images retrieved from other domain servers or other sources. Each image in the library may be associated with safe source/status or a malicious source/status. Through various image transformation and comparison techniques, the classification system 205 may determine whether an image from the domain server 250 is similar to an image in the library and identify the image as safe or a threat based on whether the similar image is associated with a safe or malicious source/status.

The URL or text associated with the content received from the domain server or network resource 250 may also be analyzed to identify email addresses, brand names, trending names, typos, or other signals using regular expressions. These signals may be compared to a signal library or recognized text that is associated with a safe source/status or a malicious source/status. Based on the comparison, the classification engine 220 may determine whether the domain server 250 is safe or a threat.

According to some embodiments, the classification engine 220 may compile the information contained in reports associated with a domain that are received from multiple network devices 240 and analyze the aggregated information. Alternatively or additionally, the classification engine 220 may analyze information contained in reports separately or in groups based on query parameters (e.g., associated with a particular version of an operating system and/or browser). In some cases, analyzing the information separately may be able to identify conflicting results which may be presented to a security administrator or other system for further analysis. For example, in some cases malicious systems may provide malicious content only when it is determined that the malicious content can exploit a network device (e.g., if the malicious content can exploit a certain version of a browser or operating system) and otherwise provide innocuous content. By varying the types of queries to a malicious system, these types of countermeasures may be detected or circumvented and the malicious system may still be reliably identified.

Once the classification engine 220 determines that a domain is malicious or is associated with malicious features, the classification may block the domain from access or report the domain to another system for dealing with the threat. In some embodiments, the network devices 240 may include network access points, switches, routers, network address translation (NAT) servers, middle boxes, virtual machines, firewall systems, gateway devices, or similar devices. When one or more domains are classified as malicious, the classification system 205 may transmit a notification to one or more of the network devices 240 instructing the network devices 240 to block the domain or related network resource.

Figure 3:
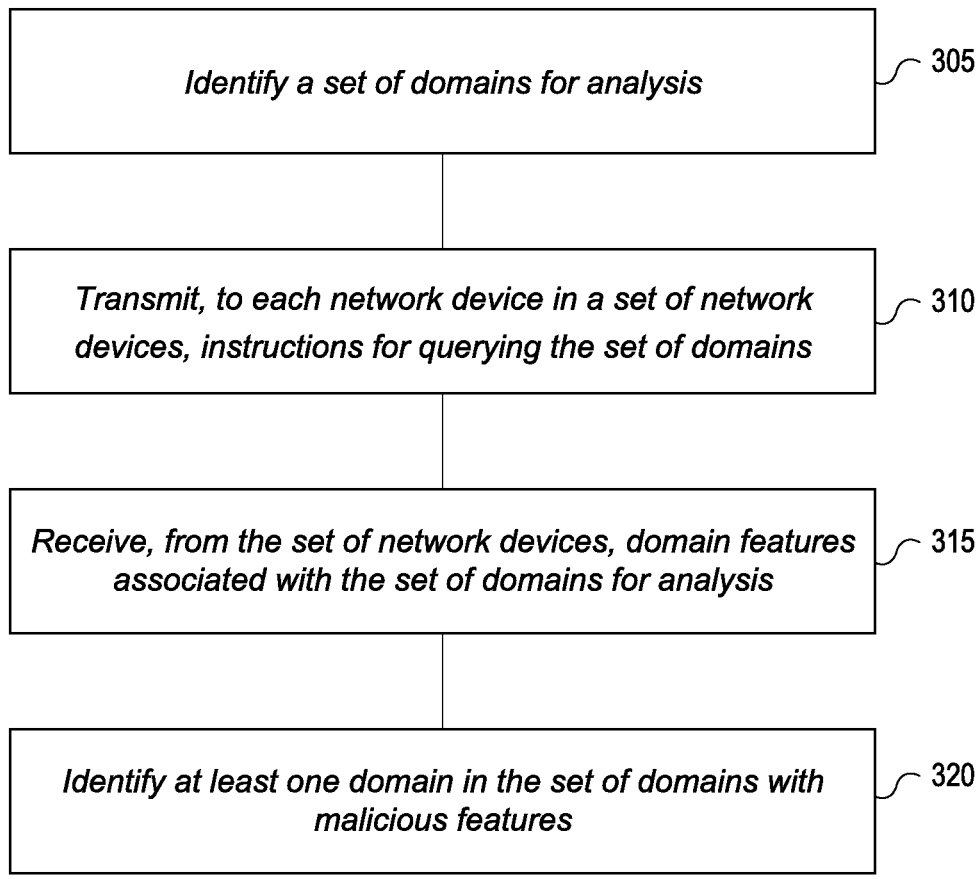
FIG. 3 shows an example process for coordinating distributed domain and network content analysis, in accordance with various embodiments of the subject technology.

FIG. 3 shows an example process 300 for coordinating distributed domain analysis, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 300 can be performed by one or more systems in a network environment such as classification system 110 of FIG. 1 or other similar system.

At operation 305, the classification system may identify a set of domains for analysis. As noted previously, the classification system may receive from a third-party system (e.g., a domain registrar or a certificate transparency logging service), a list of domains registered within a recent time period and identify a set of domains for analysis based on the list of domains. Alternatively the classification system may receive from one or more of the network devices a new domain that the network device has not encountered before and, over time, generate the set of domains based on an aggregated list of domains from the network devices. The network devices may include, for example, a network gateway device, a firewall, a router, or a user device.

The classification system may generate instructions for querying the set of domains and, at operation 310, transmit the instructions for querying the set of domains to the network devices. The instructions for querying the set of domains may include query parameters for each network device. For example, the query parameters may specify at least one of a web browser type, a web browser version, an operating system type, and an operating system version.

At operation 315, the classification system may receive domain features from the set of network devices, wherein each domain feature in the domain features is associated with a domain in the set of domains for analysis. The classification system may also receive all or portions of content retrieved from the domain by the network devices as well.

Based on the information received from the network devices, the classification system, at operation 320, identifies at least one domain in the set of domains with malicious features. The classification system may compare the domain features or content with a library of features, the library of features including the malicious features. If a domain is determined to be associated with malicious features, the classification system may block the domain or transmit instructions to the network devices or other systems to block the domain.

Figure 4:
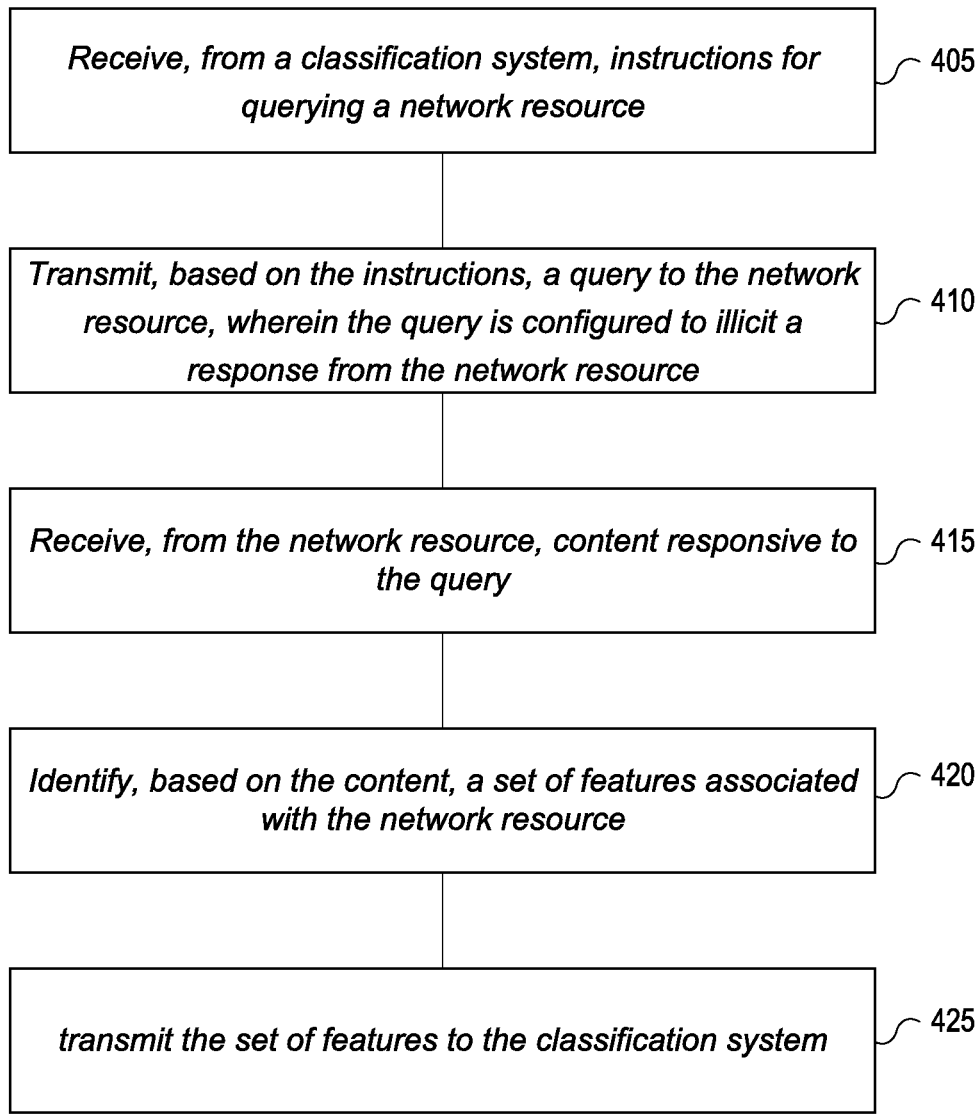
FIG. 4 shows an example process for distributed domain and network content analysis, in accordance with various embodiments of the subject technology.

FIG. 4 shows an example process 400 for distributed domain analysis, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 400 can be performed by one or more systems in a network environment such as network device 120A of FIG. 1 or other similar system.

At operation 405, the network device may receive, from a classification system, instructions for querying a network resource. The network resource may be, for example, a domain, a web server, a website, or other network resource. The instructions may include query parameters for the network resource to query the network resource. The query parameters may include, for example, a web browser type, a web browser version, an operating system type, and an operating system version, wherein the instructions further cause the system to generate the query to the network resource based on the query parameters.

At operation 410, the network resource may transmit, based on the instructions, a query to the network resource. The query may be configured to illicit a response from the network resource and, at operation 415, the network device may receive content responsive to the query from the network resource. The query may be, for example, a request to load a web page hosted by the domain and the content responsive to the query may include the web page.

At operation 420, the network device may identify, based on the content, a set of features associated with the network resource and, at operation 425, transmit the set of features to the classification system. All or a portion of the content received from the network resource may also be transmitted to the classification system.

The information transmitted to the classification may be used to determine whether the network resource is malicious or has characteristics associated with malicious sources. If the classification system determines that the network resource is a threat, it may instruct the network device to block the network resource. For example, the network device may receive, from the classification system, instructions to block the network resource and the network device may be configured to block access to the network resource based on the instructions.

Figure 5A:
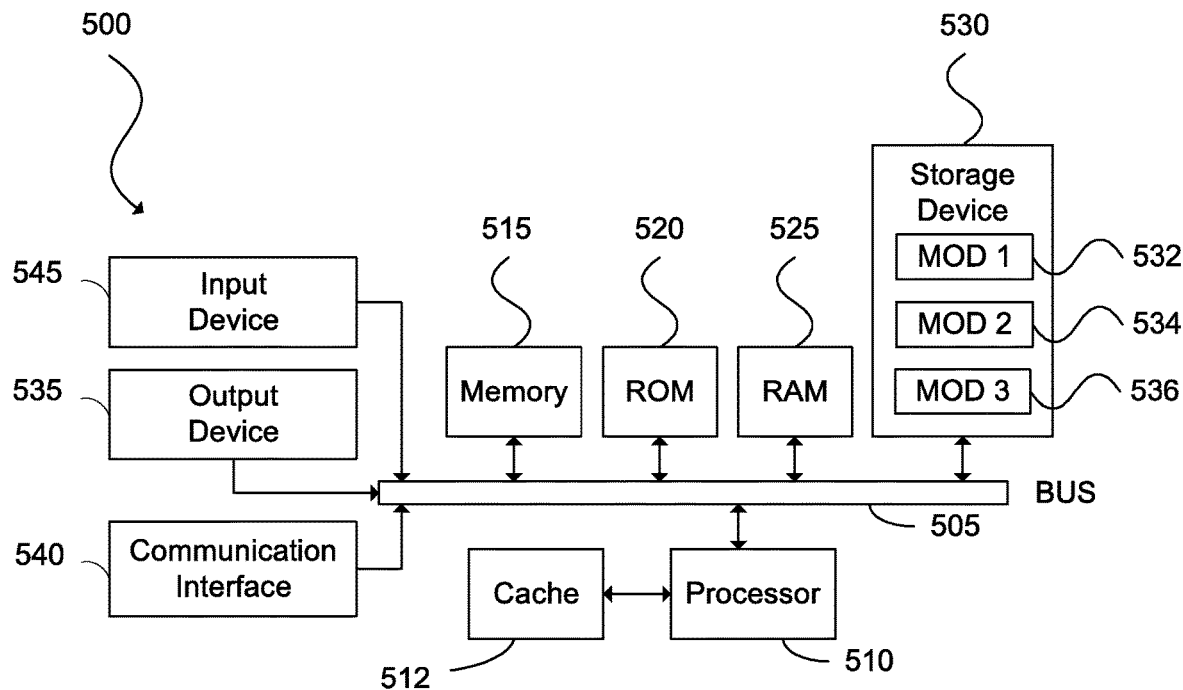
FIGS. 5A and 5B illustrate examples of systems in accordance with some embodiments.
Figure 5B:
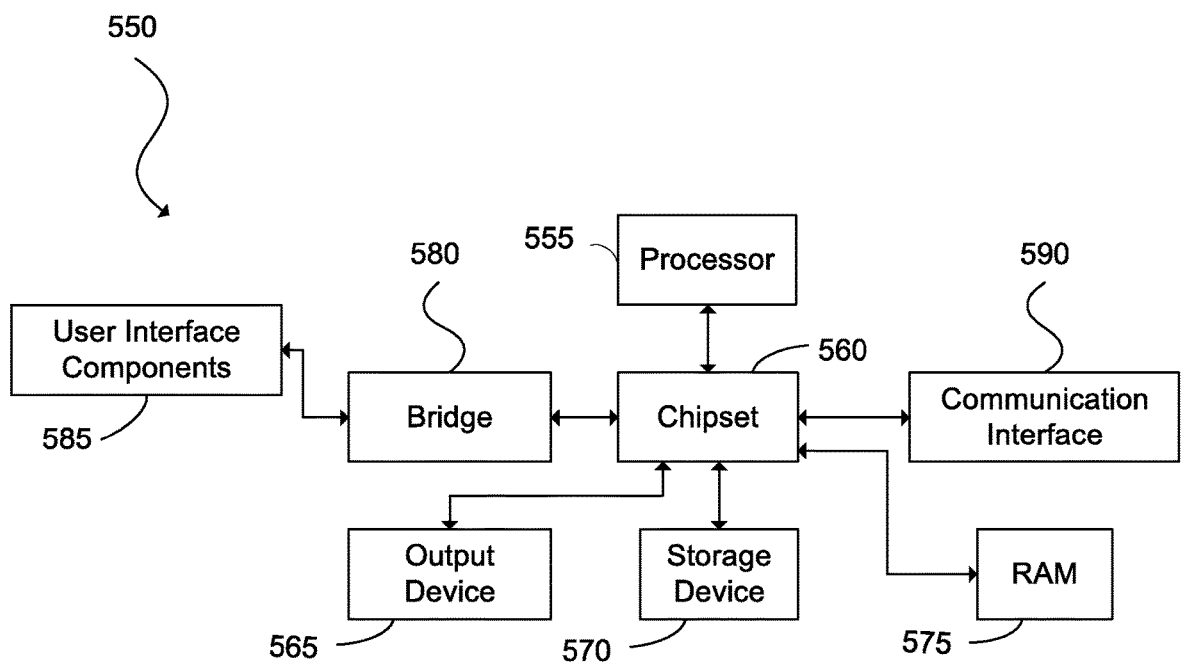

FIG. 5A and FIG. 5B illustrate systems in accordance with various embodiments. The more appropriate system will be apparent to those of ordinary skill in the art when practicing the various embodiments. Persons of ordinary skill in the art will also readily appreciate that other systems are possible.

FIG. 5A illustrates an example architecture for a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) in a storage device 520 and random access memory (RAM) 525, to the processor 510. The computing system 500 can include a cache 512 of high-speed memory connected directly with, in close proximity to, or integrated as part of the processor 510. The computing system 500 can copy data from the memory 515 and/or the storage device 530 to the cache 512 for quick access by the processor 510. In this way, the cache 512 can provide a performance boost that avoids processor delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

Storage device 530 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, and solid state media, for example. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 555 analyzing data stored in the storage device 570 or the RAM 575. Further, the computing system 500 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
identifying a set of domains for analysis;
transmitting, to each network device in a set of network devices, a set of query parameters to perform random queries of the set of domains;
receiving domain features from the set of network devices identified based on the random queries, wherein each domain feature in the domain features is associated with a domain in the set of domains for analysis, and wherein one or more of the domain features comprises website content retrieved from one or more websites associated with the set of domains; and
identifying, based on the domain features, at least one domain, from the set of domains, having one or more malicious features.

2. The computer-implemented method of claim 1, wherein identifying the set of domains for analysis comprises receiving, from a third-party system, a list of domains registered within a time period.

3. The computer-implemented method of claim 1, wherein identifying the set of domains for analysis comprises receiving, from at least one network device in the set of network devices, a domain of interest in the set of domains.

4. The computer-implemented method of claim 1, wherein the set of query parameters specify at least one of a web browser type, a web browser version, an operating system type, and an operating system version.

5. The computer-implemented method of claim 1, wherein the set of query parameters includes a corresponding plurality of query parameters for each network device, and wherein a set of instructions specify different parameters from the plurality of query parameters to be used with different queries and the different queries to be separately transmitted at different times over a time period to achieve the random queries.

6. The computer-implemented method of claim 1, further comprising:
transmitting, to the set of network devices, instructions to block the at least one domain with the one or more malicious features.

7. The computer-implemented method of claim 1, further comprising:
analyzing a first subset of the domain features from a first network device in the set of network devices separately from a second subset of the domain features from a second network device in the set of network devices.

8. The computer-implemented method of claim 1, wherein the set of network devices comprises at least one of a user device, a network gateway device, a firewall, or a router.

9. The computer-implemented method of claim 1, further comprising:
comparing the domain features with a library of features, the library of features including the one or more malicious features.

10. The computer-implemented method of claim 1, wherein the set of network devices is geographically dispersed.

11. A non-transitory computer-readable medium comprising instructions, the instructions, when executed by a computing system, cause the computing system to:
identify a domain for analysis;
transmit, to each network device in a set of network devices, a set of query parameters to perform random queries of the domain;
receive, from the set of network devices, domain reports associated with the domain determined based on the random queries, the domain reports comprising data associated with website content retrieved by the set of network devices from one or more websites associated with the domain; and
determine, based on the domain reports, that the domain is associated with malicious features.

12. The non-transitory computer-readable medium of claim 11, wherein each domain report in the domain reports comprises domain features generated based on the website content retrieved from the domain.

13. The non-transitory computer-readable medium of claim 11, wherein each domain report in the domain reports comprises content crawled from domain.

14. The non-transitory computer-readable medium of claim 11, wherein the domain for analysis is a domain registered within a time period.

15. A system comprising:
one or more processors; and
at least one non-transitory computer-readable medium storing instructions that, when executed by the one or more processors, cause the one or more processors to:
receive, from a classification system, instructions for a random query of a network resource;
transmit, based on the instructions, a set of query parameters to the network resource, wherein the random query is configured to illicit a response from the network resource;
receive, from the network resource, content responsive to the random query, the content comprising website content retrieved by the network resource from one or more domains associated with the network resource;
identify, based on the content, a set of features associated with the network resource; and
transmit the set of features to the classification system.

16. The system of claim 15, wherein the network resource is one of a domain, a web server, or a web site.

17. The system of claim 15, wherein the instructions further cause the one or more processors to:

identify new network resource unknown to the system; and transmit a uniform resource locator associated with the new network resource to the classification system.

18. The system of claim 15, wherein the set of query parameters include at least one of a web browser type, a web browser version, an operating system type, and an operating system version.

19. The system of claim 15, wherein the instructions further cause the one or more processors to:

receive, from the classification system, instructions to block the network resource; and block access to the network resource based on the instructions.

20. The system of claim 15, wherein the set of query parameters specify different parameters to be separately used in different queries and the different queries to be separately transmitted at different times over a period of time to achieve the random query.

* * * * *